United States Patent [19]

Costolow

[11] 3,972,854

[45] Aug. 3, 1976

[54] COLOR CONTROL OF POLYPROPYLENE
[75] Inventor: John J. Costolow, Pasadena, Tex.
[73] Assignee: Phillips Petroleum Company, Bartlesville, Okla.
[22] Filed: Mar. 3, 1975
[21] Appl. No.: 554,528

[52] U.S. Cl. .......................... 260/23 H; 260/45.7 P; 260/45.85 B; 260/45.85 H; 260/45.85 S; 260/45.95 H; 260/45.95 R
[51] Int. Cl.$^2$............................................ C08J 3/20
[58] Field of Search................. 260/45.7 P, 45.85 B, 260/45.85 S, 45.95 H, 45.95 R, 23 H, 94.9 F, 94.9 GC, 94.9 P

[56] References Cited
UNITED STATES PATENTS
3,793,290 2/1974 Dix et al. ........................ 260/45.75

OTHER PUBLICATIONS
Crystalline Olefin Polymers — Part II, Raff et al., (1965), pp. 371–373, 395, 396.
Journal of Polymer Science — vol. XXIV, No. 105, 1957 — pp. 138 and 139.

*Primary Examiner*—V. P. Hoke

[57] ABSTRACT

Control of Hunter A and B color values of fiber-grade polypropylene compositions having a stabilizer additive system therein is achieved by processing the polypropylene and additive system in an atmosphere having an oxygen content in the range of 0.1 to 5.0 volume percent. Desired color of the processed polymeric composition is maintained by monitoring the color of the pelleted product and, responsive thereto, controlling oxygen content of the mixer atmosphere or by measuring the oxygen content of the atmosphere of the mixer and maintaining same within a predetermined concentration whereby the color of the pellets is maintained within a predetermined range.

11 Claims, 1 Drawing Figure

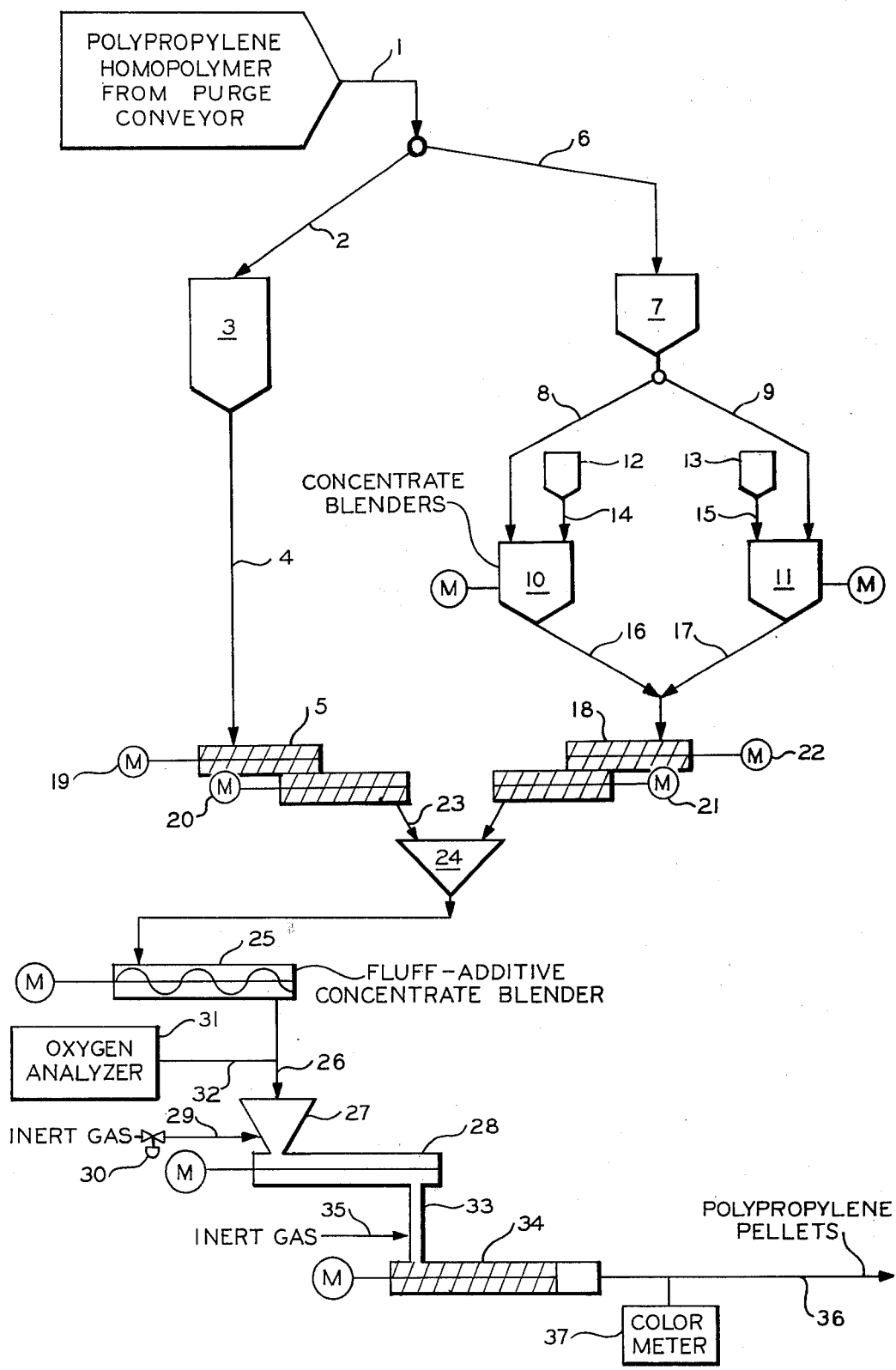

COLOR CONTROL OF POLYPROPYLENE

This invention relates to the production of fiber-grade polypropylene. More specifically, this invention relates to a process for controlling color of fiber-grade polypropylene compositions.

Fiber-grade polypropylene is distinguishable from the homopolymer per se in its antioxidant protection and, desirably, uniformity of color and lightness. In the production of such fiber-grade resin, various additives are admixed with the resin in amounts sufficient to impart the desired level of antioxidant protection. Generally such additives are admixed with the polymer during conversion of the polypropylene from a powder or fluff form into a pellet form for subsequent conversion to fiber products. Such additive systems provide protection against polymer oxidation due to exposure to atmospheric oxygen, heat, contaminants and sunlight. However, satisfactory processing of the polymer and additive system requires control over color of the pelleted polymeric composition. Such control, however, has heretofore presented some problems due to the difficulty of producing a pelleted product having both the desired lightness and uniformity of color.

It is thus an object of this invention to provide a color-stabilized polypropylene composition.

Another object of this invention is to provide a method for controlling color of a stabilized polypropylene composition.

Other objects, aspects and the several advantages of the invention will be apparent to one skilled in the art from reading the following disclosure and claims and the accompanying drawing, which is a schematic flow diagram illustrating a preferred embodiment of the process of the invention.

In accordance with the present invention, I have discovered that color control of fiber-grade pelleted polypropylene can be achieved by regulating the oxygen content of the atmosphere in the processing equipment used to compound the polypropylene with a stabilizer system and subsequently convert the resulting composition to a pelleted product.

More specifically, I have discovered that control over the Hunter color values of A and B of a pelleted fiber-grade polypropylene composition can be achieved while at the same time keeping the Hunter color value L essentially constant by processing the polypropylene and additive system for same in an inert atmosphere having an oxygen content in the range of 0.1 to 5.0 volume percent.

The polypropylene processed in accordance with the present invention is a homopolymer with physical properties as follows:

| Property | ASTM Test | Value Range |
|---|---|---|
| Density | D1505-68 | 0.90–0.91 |
| Melt flow (Condition L), gms/10 min. | D1238-65T | 0.5–30.0 |
| Environmental stress cracking resistance, hrs., $F_{50}$ | D1693-70 | >1000 |
| Tensile strength at yield, psi, 2"/min. | D638-68 Type I specimen | >4000 |
| Flexural modulus, psi | D790-66 | 200,000–300,000 |
| Melting point, °C. | D2117-64 | 320–360 |
| Hardness, Shore D | D2240-68 | 68–78 |

In producing the pelleted fiber-grade polypropylene compositions of this invention, it is desired that such compositions have a color content such that the Hunter value A (green-red) is in the range of −14 to −10 and the Hunter value B (blue-yellow) is in the range of +13 to +16, while the Hunter value L (lightness) is maintained essentially constant, i.e., in the range of 50 to 60.

Hunter values for color, as utilized in the present invention, are the tristimulus color values of L (lightness), A (green-red) and B (blue-yellow) as measured using a Hunterlab color difference meter. A general discussion of the principles involved in this instrument is published in *Journal of the Optical Society of America* 48, No. 12, December 1958, pages 985–995.

In formulating the polypropylene composition of the present invention having the color content thereof within the ranges above defined, there is generally employed an additive system which consists essentially of the following:

| Additive | Amounts, php Broad | Preferred |
|---|---|---|
| (a) nickel amine complex of 2,2'-thiobis(p-alkylphenol) | 0.5–3.0 | 0.7–2.0 |
| (b) a trialkyl-substituted hindered phenol | 0.01–0.31 | 0.02–0.13 |
| (c) antioxidant | 0.008–0.15 | 0.01–0.07 |
| (d) organic phosphite | 0.02–0.12 | 0.04–0.10 |
| (e) metal salt of an organic monocarboxylic acid | 0.03–0.40 | 0.07–0.15 |

In the formulation as given above, the nickel amine complex (a) is composed of at least one nickel amine complex of 2,2'-thiobis(p-alkylphenol) wherein: the complex-forming amine is a member selected from the group consisting of ammonia, primary aliphatic amines, primary aromatic amines, hydroxy amines, and cyclic secondary amines; said alkyl group contains up to 18 carbon atoms; and said complex is characterized by a single nickel-to-nitrogen coordinate bond and a single nickel-to-sulfur coordinate bond for each nickel atom in the complex molecule. Such nickel amine complexes are commercially available compounds of the type disclosed in U.S. Pat. No. 3,215,717.

Suitable trialkyl-substituted hindered phenols (b) are those selected from the group consisting of 2,6-di-t-butyl-p-cresol; 2,6-di-cyclohexyl-p-cresol; 2,6-di-t-amyl-p-cresol; 2,6-diisopropyl-4-ethylphenol; 2,6-di-t-octyl-4-n-propylphenol; 2,6-di-cyclohexyl-4-n-octylphenol; 2-isopropyl-4-methyl-6-t-butylphenol; 2-t-butyl-4-ethyl-6-t-octylphenol; 2-isobutyl-4-ethyl-6-t-hexylphenol; 2-cyclohexyl-4-n-butyl-6-isopropylphenol; and mixtures thereof.

Antioxidant (c) useful in the present invention is selected from the group consisting of octadecyl 3-(3,5-di-t-butyl-4-hydroxyphenyl)propionate; 1,2-bis[3-(3,5-di-t-butyl-4-hydroxyphenyl)propionate]ethane; n-butylimino N,N-bis[ethylene 3-(3,5-di-t-butyl-4-hydroxyphenyl)propionate]; tetrakis[methylene 3-(3,5-di-t-butyl-4-hydroxyphenyl)propionate]methane; 1,1,1-tris[methylene 3-(3,5-di-t-butyl-4-hydroxyphenyl)propionate]ethane; n-octadecyl(3,5-di-t-butyl-4-hydroxyphenyl)acetate; di-n-octadecyl(3,5-di-t-butyl-4-hydroxybenzyl)-phosphonate; 1,3,5-trimethyl-2,4,6-tris(3,5-di-t-butyl-4-hydroxybenzyl)benzene; 2,2'-methylenebis(4-methyl-6-t-butylphenol); 2,2'-methylenebis(6-t-butylphenol); 2,2'-ethylidenebis(4-t-butyl-6-t-octylphenol); 4,4'-methylenebis-(3-methyl-6-t-butylphenol); 4,4'-methylenebis(2-methyl-6-t-butylphenol); and mixtures thereof.

The organic phosphite (d) for the additive system useful in the present invention is an organic phosphite selected from the group consisting of dioctyl phosphite, trioctyl phosphite, diethyl phosphite, dibutyl phosphite, diphenyl phosphite, didecyl phosphite, tridecyl phosphite, phenyldidecyl phosphite, phenyldi(hexadecyl) phosphite, diphenyldecyl phosphite, phenyl(nonadecyl) phosphite, and diphenylheptadecyl phosphite, and mixtures thereof.

Metal salts of monocarboxylic acids (e) of the additive system of the invention are salts of such acids wherein the metal is selected from the group consisting of zinc, calcium, barium, magnesium and strontium and the monocarboxylic acid contains from 12 to 24 carbon atoms.

One presently preferred additive system is that formed by admixing (a) [2,2'-thiobis(4-tert-octylphenolato)]n-butylamine nickel II, (b) 2,6-di-tert-butyl-4-methylphenol, (c) octyldecyl[3(3,5-di-tert-butyl-4-hydroxyphenyl)]propionate, (d) dioctyl phosphite and (e) calcium stearate.

In the processing of the polypropylene and additive systems to form a color-controlled pelleted product in accordance with the present invention, in one presently preferred aspect of the invention, such processing or compounding of the polymer and additive, preferably in the form of a concentrate, is carried out in a Farrel Continuous Mixer (Farrel Co., Div. USM Corp., Ansonia, Conn.). However, the particular processing equipment is not critical to the process of this invention so long as the oxygen content of the atmosphere therein is maintained in the range as specified herein.

Referring now to the drawing, a first portion of polypropylene fluff obtained from a purge conveyor (not shown) is introduced via lines 1 and 2 to a mixture feed tank 3 which retains the polymer fluff therein to be supplied via conduit 4 to master feeder 5. A second portion of the polymer fluff from conduit 1 is introduced via conduit 6 into polymer fluff weigh tank 7 which serves as a polymer supply source via conduits 8 and 9 to batch additive concentrate ribbon blenders 10 and 11. Additive hoppers 12 and 13 are provided to serve as source of the additive system ultimately to be compounded with the polypropylene fluff. The previously formulated additive system is introduced via conduit 14 or 15 into ribbon blender 10 or 11 in such amount that a batch concentrate of polymer and additive is formed. The resulting additive concentrate is thereafter introduced via conduit 16 or 17 to feeder 18. By controlling the rate of feed of fluff feeder 5 and concentrate feeder 18, the ultimate formulation of the polypropylene pellets is controlled. Such control is readily achieved by selectively controlling the operating speeds of the motors 19, 20, 21 and 22.

Fluff from tank 3 is introduced via feeder 5 and conduit 23 to hopper 24 of concentrate blender 25. Likewise, the initially compounded fluff-additive concentrate is introduced into the hopper 24 of blender 25. Following initial blending of fluff and concentrate in blender 25, the resulting composition is passed via conduit 26 to hopper 27 and then to an intensive mixing device 28. The mixing device is preferably a Farrel continuous mixer the atmosphere of which is maintained essentially inert by flow of inert gas such as nitrogen from a source not shown through conduit 29. Inert gas introduced into feed hopper 27 further serves to purge air from the polymer. Since the inert gas tends to flow countercurrently to the polymer, purging of air from the feeders 5 and 18 is also achieved. Flow of inert gas is manipulated via valve 30 to control the oxygen of the atmosphere in the conduit between the blender 25 and the continuous mixer feed hopper 27. Oxygen analyzer 31, such as a Beckman Model F-3 Oxygen Analyzer (Beckman Instruments, Inc., Fullerton, Calif.), is provided to receive via conduit 32 a sample of atmosphere in conduit 26 and thereafter provide a signal representative of the oxygen content of the atmosphere. Responsive to the thus obtained signal, valve 30 in line 29 is manipulated so as to control the percentage of oxygen content in the atmosphere through control of inert gas addition.

Effluent from the Farrel continuous mixer 28 is passed via conduit 33 to a Farrel melt extruder 34 wherefrom the desired polypropylene fiber-grade pellets are obtained. If desired, further inert gas can be introduced into conduit 33 via conduit 35 to assist in maintaining the desired atmosphere in the conduit 33.

In another embodiment of this invention, the color of the pellets obtained from extruder 34 via conduit 36 is monitored by measuring the tristimulus color values on samples of the pellets using a Hunterlab Model D25M Color Difference Meter (Hunter Associates Laboratory, Inc., Fairfax, Va.). Upon deviation of the measured color from the established color parameters, the oxygen content in the continuous mixer can be regulated by the regulation of flow of inert gas through line 29 by adjustment of valve 30 either manually or otherwise, which in turn adjusts the oxygen content of the atmosphere within the blender, in turn serving to return the color values to the previously established parameters.

The following examples will illustrate further the invention.

EXAMPLE I

Polypropylene fluff, a 12 melt index homopolymer with a bulk density of about 28 pounds per cubic foot (448 kg/m$^3$) was blended with an additive system in amounts such as to give the indicated concentrations in the final product:

| Additive Component | Weight % |
|---|---|
| BHT (Monsanto Co.)[1] | 0.05 |
| Cysorb 1084 (American Cyanamid)[2] | 1.50 |
| Ergonox 1076 (Geigy Chemical Corp.)[3] | 0.02 |
| Dioctyl phosphite | 0.10 |
| Calcium stearate | 0.07 |

[1] 2,6-di-tert-butyl-4-methylphenol
[2] [2,2'-thiobis(4-tert-octyl-phenolato)]n-butylamine nickel II
[3] octyldecyl [3(3,5-di-tert-butyl-4-hydroxyphenyl)]propionate After blending, the fluff was conveyed to the feed hopper of a No. 9 Farrel continuous mixer at a rate of about 7,000 lb./hr. (3175 kg/hr). Nitrogen was continuously introduced into the feed hopper to purge air from the polymer. This nitrogen tended to flow countercurrently to the polymer such that it also purged air from the conveying chute and the fluff-additive blending equipment. The flow of nitrogen was manipulated to control the oxygen content of the atmosphere in the chute between the blender and the continuous mixer feed hopper. Oxygen content was analyzed with a Beckman Model F-3 Oxygen Analyzer. Polymer issued from the mixer as a continuous sheet at a temperature of about 335° F. (179° C.) and was immediately fed to a Farrel 12-inch melt extruder which produced ⅛-inch polymer pellets. Color of the pellets was monitored by measuring the tristimulus color values on samples, using a Hunterlab Model D25M Color Difference Meter.

Use of the Color Difference Meter provided the following readings for L (lightness), A (green-red) and B (blue-yellow) at the indicated oxygen concentration as measured by the Beckman Oxygen Analyzer:

| Oxygen in Atmosphere (Vol. %) | L | Hunter Color Values A | B |
|---|---|---|---|
| 7.0 | 54.7 | −16.0 | 12.6 |
| 3.0 | 52.9 | −14.0 | 14.0 |
| 1.8 | 52.4 | −12.9 | 14.6 |
| 1.5 | 53.0 | −12.7 | 14.5 |
| 1.4 | 53.0 | −12.6 | 14.7 |

The above results show that utilization of an oxygen concentration within the range of this invention effects a control of A and B values within the range generally preferred for use in producing dyed or pigmented fiber products while maintaining lightness (L) essentially constant.

EXAMPLE II

A further compounding of polypropylene fluff was carried out in the manner of Example I, using the additive system thereof and using conditions essentially identical except that the Farrel continuous mixer was operated under somewhat more severe conditions with an exit temperature of 370° F. (188° C.) as compared with that of 355° F. (179° C.). The following results were obtained.

| Oxygen in Atmosphere (Vol. %) | L | Hunter Color Values A | B |
|---|---|---|---|
| 2.1 | 55.0 | −14.7 | 13.4 |
| 1.6 | 55.5 | −14.3 | 13.4 |
| 0.70 | 55.6 | −13.8 | 13.6 |
| 0.47 | 54.7 | −13.0 | 14.1 |
| 0.33 | 55.8 | −12.7 | 14.7 |
| 0.15 | 56.0 | −12.7 | 14.8 |

From the above it can be observed that for the more severe working conditions in the mixer, a lower oxygen concentration can be utilized to achieve the desired color range of A and B Hunter values while still keeping the lightness value (L) essentially constant.

From the foregoing it can be concluded that the color of compounded polypropylene pellets can be readily maintained within the desired Hunter color value ranges of A and B with an essentially constant L value by maintaining the oxygen content in the otherwise inert atmosphere of the blending equipment within the range of 0.1 to 5.0 volume percent.

Reasonable variations and modifications of this invention can be made, or followed, in view of the foregoing disclosure without departing from the spirit or scope thereof.

What is claimed is:

1. A process for controlling the tristimulus color value of A, B and L of a fiber-grade composition of polypropylene wherein the tristimulus color value A is maintained in the range of −14 to −10; the tristimulus color value of B is maintained in the range of +13 to +16; while the tristimulus color value of L is maintained in the range of +50 to +60; and wherein said composition consists essentially of polypropylene and a stabilizing amount of an antioxidant additive system which comprises compounding said composition in a compounding zone wherein the atmosphere thereof has an oxygen content in the range of 0.1 to 5.0 volume percent.

2. A process according to claim 1 wherein said additive system consists essentially of (a) from 0.5 to 3.0 php of a nickel amine complex of 2,2'-thiobis(p-alkylphenol), (b) from 0.01 to 0.31 php of a trialkyl-substituted hindered phenol, (c) from 0.008 to 0.15 php of an antioxidant, (d) from 0.02 to 0.12 php of an organic phosphite and (e) from 0.03 to 0.40 php of a metal salt of an organic monocarboxylic acid.

3. A process according to claim 1 wherein said additive system consists essentially of (a) from 0.7 to 2.0 php of nickel amine complex of 2,2'-thiobis(p-alkylphenol), (b) from 0.02 to 0.13 php of a trialkyl-substituted hindered phenol, (c) from 0.01 to 0.07 php of antioxidant, (d) from 0.04 to 0.10 php organic phosphite and (e) from 0.07 to 0.15 php of metal salt of an organic monocarboxylic acid.

4. A process according to claim 2 wherein (a) is [2,2'-thiobis(4-tert-octyl-phenolato)]n-butylamine nickel II, (b) is 2,6-di-tert-butyl-4-methylphenol, (c) is octadecyl 3-(3,5-di-t-butyl-4-hydroxyphenyl)propionate, (d) is dioctyl phosphite and (e) is calcium stearate.

5. A process according to claim 3 wherein (a) is [2,2'-thiobis(4-tert-octyl-phenolato)]n-butylamine nickel II, (b) is 2,6-di-tert-butyl-4-methylphenol, (c) is octadecyl 3-(3,5-di-t-butyl-4-hydroxyphenyl)propionate, (d) is dioctyl phosphite and (e) is calcium stearate.

6. A process for controlling the tristimulus color values of A, B and L within a predetermined range for a compounded fiber-grade composition of polypropylene which comprises
   a. introducing polypropylene into a compounding zone,
   b. introducing an antioxidant additive system into said compounding zone,
   c. compounding the resulting mixture of (a) and (b) so as to form a homogeneous composition thereof in said compounding zone while maintaining the oxygen content of the otherwise inert atmosphere in said compounding zone in the range of 0.1 to 5.0 volume percent oxygen; and
   d. measuring the tristimulus color values of said homogeneous composition and responsive thereto, when said values are outside the range for A of −14 to −10, for B of +13 to +16, and for L of 50 to 60, adjusting the oxygen content of said compounding zone so as to cause the color values of said homogeneous composition to fall within said ranges for A, B and L.

7. A process according to claim 6 wherein said additive system consists essentially of (a) from 0.5 to 3.0 php of a nickel amine complex of 2,2'-thiobis(p-alkylphenol), (b) from 0.01 to 0.31 php of a trialkyl-substituted hindered phenol, (c) from 0.008 to 0.15 php of an antioxidant, (d) from 0.02 to 0.12 php of an organic phosphite and (e) from 0.03 to 0.40 php of a metal salt of an organic monocarboxylic acid.

8. A process according to claim 7 wherein (a) is [2,2'-thiobis(4-tert-octyl-phenolato)]n-butylamine nickel II, (b) is 2,6-di-tert-butyl-4-methylphenol, (c) is octadecyl 3-(3,5-di-t-butyl-4-hydroxyphenyl)propionate, (d) is dioctyl phosphite and (e) is calcium stearate.

9. A process for controlling the tristimulus color values of A, B and L of a compounded fiber-grade composition of polypropylene wherein the value of A is in the range of −14 to −10, the value of B is in the range of +13 to +16, and the value of L is essentially constant and within the range of 50 to 60, which consists essentially of polypropylene having a stabilizing amount of an antioxidant additive system admixed therein which comprises
  a. introducing said polypropylene into a compounding zone,
  b. introducing said stabilizing amount of antioxidant additive system into said compounding zone, and
  c. compounding the resulting mixture of (a) and (b) in said compounding zone while maintaining the oxygen content of the otherwise inert atmosphere in the range of 0.1 to 5.0 volume percent.

10. A process according to claim 9 wherein said additive system consists essentially of (a) from 0.5 to 3.0 php of a nickel amine complex of 2,2'-thiobis(p-alkylphenol), (b) from 0.01 to 0.31 php of a trialkyl-substituted hindered phenol, (c) from 0.008 to 0.15 php of an antioxidant, (d) from 0.02 to 0.12 php of an organic phosphite and (e) from 0.03 to 0.40 php of a metal salt of an organic monocarboxylic acid.

11. A process according to claim 10 wherein (a) is [2,2'-thiobis(4-tert-octyl-phenolato)]n-butylamine nickel II, (b) is 2,6-di-tert-butyl-4-methylphenol, (c) is octadecyl 3-(3,5-di-t-butyl-4-hydroxyphenyl)propionate, (d) is dioctyl phosphite and (e) is calcium stearate.

* * * * *